(12) United States Patent
Ertel

(10) Patent No.: US 7,482,595 B1
(45) Date of Patent: Jan. 27, 2009

(54) DIGITAL RADIOGRAPHY DETECTOR ASSEMBLY WITH ACCESS OPENING

(75) Inventor: Jason R. Ertel, Stow, OH (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 11/278,406

(22) Filed: Mar. 31, 2006

(51) Int. Cl.
    *G01T 1/24* (2006.01)
(52) U.S. Cl. ................................. 250/370.09
(58) Field of Classification Search ............ 250/370.09, 250/370.08, 370.01
    See application file for complete search history.

(56) References Cited

U.S. PATENT DOCUMENTS

| | | | | |
|---|---|---|---|---|
| 4,194,625 A | * | 3/1980 | Stievenart et al. | 378/185 |
| 6,042,267 A | * | 3/2000 | Muraki et al. | 378/169 |
| 6,239,447 B1 | * | 5/2001 | Toda | 250/584 |
| 6,815,703 B2 | * | 11/2004 | Iwakiri | 250/588 |
| 7,365,337 B2 | * | 4/2008 | Tsuchino et al. | 250/370.09 |
| 2007/0023667 A1 | * | 2/2007 | Watanabe | 250/370.01 |
| 2008/0054182 A1 | * | 3/2008 | Yokoyama et al. | 250/370.09 |

* cited by examiner

*Primary Examiner*—David P Porta
*Assistant Examiner*—David S Baker

(57) ABSTRACT

A portable medical apparatus comprising a digital radiographic image detector assembly having at least one access opening extending through an enclosure of the assembly for troubleshooting, repairing and/or replacing field replaceable components within the assembly or components that are external to the assembly but attach internally within the assembly, without exposing the rest of the assembly to the outside environment. The portable medical apparatus includes a housing, a radiographic imaging device enclosed within the housing, at least one access opening extending through the housing for accessing components of the radiographic imaging device, and an access cover removably attached to the at least one access opening.

25 Claims, 10 Drawing Sheets

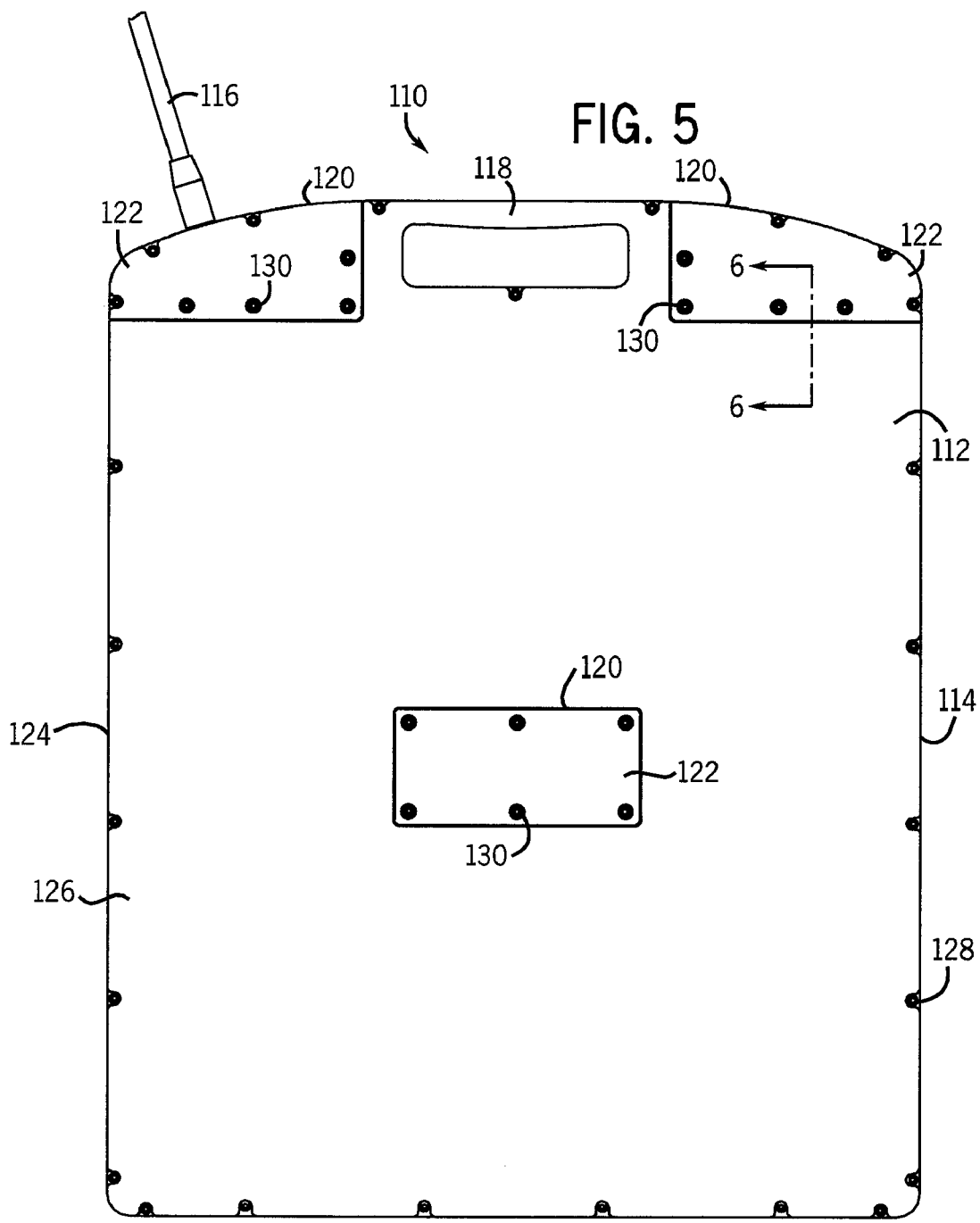

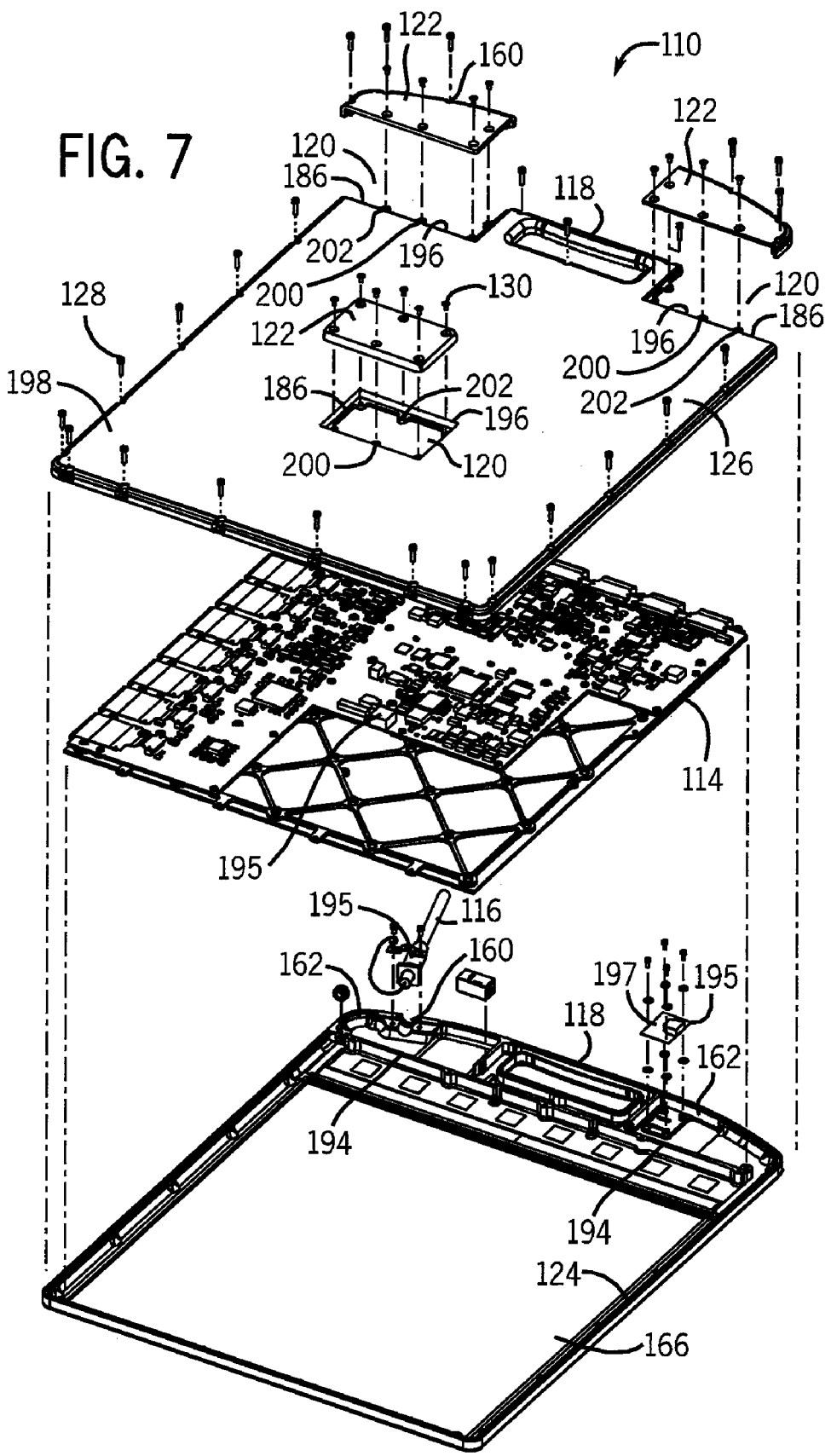

DIGITAL RADIOGRAPHY DETECTOR ASSEMBLY WITH ACCESS OPENING

BACKGROUND OF THE INVENTION

The present invention relates generally to digital radiography systems, and more particularly to, a digital radiographic image detector assembly having at least one access opening for troubleshooting, repairing and/or replacing field replaceable components within the detector or components that are external to the detector but attach internally within the detector.

Digital radiography systems, including portable digital radiography systems, have grown in popularity and use over the past number of years. These digital radiography systems facilitate the production of direct, digital X-ray information captured by a flat panel image detector and sent to an image processor or control computer for processing and display.

The portable digital radiography systems typically include a portable X-ray unit with a portable flat panel image detector tethered to the portable X-ray unit with a flexible cable. The tether typically includes cables and/or wiring for transferring power from a power supply or other power source on the X-ray unit to the detector and cables and/or wiring for transferring communications between the X-ray unit and the detector. The tether cable enters the enclosure of the detector for attachment to internal components within the detector. Because of its portable design, the flat panel image detector can be freely positioned in relation to a patient's anatomy when taking X-rays of the patient's anatomy. The portability and flexibility of the tether cable, which is preferred by users, often creates tension and stress on the tether, thereby causing damage to the tether after a period of use, requiring it to be replaced. The only way to replace the tether cable on prior art detectors is to open the entire enclosure, thereby exposing all of the internal components of the detector to the potentially harmful environment of a hospital or clinic.

Having to remove the entire enclosure of the detector creates a risk of potential failure of the detector, because it exposes sensitive electronic components within the detector to moisture, fluids, bodily fluids, cleaning fluids, chemicals, pharmaceuticals, dirt, dust, electrostatic discharge, and other contaminants found in hospitals and clinics. Therefore, exposure of the detector to physical abuse and environmental containments is likely to cause failures in the detector. Thus, it is likely that the tether and other internal components of the detector will need to be repaired and/or replaced periodically over time.

Therefore, it would be desirable to provide a digital radiography detector having at least one access opening for troubleshooting, repairing, removing and replacing field replaceable components within the detector or components that are external to the detector but attach internally within the detector, without having to open the entire enclosure and exposing all of the detector's components to physical damage or contamination, and to reduce the risks associated with field repair, removal, replacement and re-assembly.

SUMMARY OF THE INVENTION

The present invention provides a portable medical apparatus comprising a digital radiographic image detector assembly having at least one access opening extending through an enclosure of the assembly for troubleshooting, repairing and/or replacing field replaceable components within the assembly or components that are external to the assembly but attach internally within the assembly, without exposing the rest of the assembly to the outside environment.

In an embodiment, a portable medical apparatus comprises a housing, a radiographic imaging device enclosed within the housing, at least one access opening extending through the housing for accessing components of the radiographic imaging device, and an access cover removably attached to the at least one access opening.

In another embodiment, a digital radiography detector assembly comprises a radiographic imaging device, an outer housing enclosing the radiographic imaging device therein, at least one access opening extending through the outer housing for accessing field replaceable components within the radiographic imaging device or components that are external to the device but attach internally within the device, and a removable access cover removably attached to the at least one access opening.

In yet another embodiment, a digital radiography detector assembly comprises a housing having a first panel attached to a second panel with a plurality of fastening devices, a digital radiographic imaging device enclosed within the first panel and the second panel of the housing, at least one access opening extending through the first panel and/or the second panel of the housing for accessing field replaceable components within the digital radiographic imaging device or components that are external to the device but attach internally within the device, and a removable access cover removably attached to the at least one access opening.

In still yet another embodiment, a wireless digital radiography detector assembly comprises a housing, a digital radiographic imaging device enclosed within the housing, at least one access opening extending through the housing for accessing field replaceable components within the digital radiographic imaging device, and a removable access cover removably attached to the at least one access opening.

The advantages of providing at least one access opening in a portable medical apparatus include the following: 1) the at least one access opening allows access to tether cable connections inside the enclosure without exposing the other sensitive internal components of the apparatus to field contamination; 2) the at least one access opening greatly simplifies the replacement/repair process, allowing the tether cable and/or other small components to be replaced in the field in a very short amount of time; 3) the at least one access opening protects unused diagnostic communication and/or power connections; 4) the at least one access opening protects vital information that may be damaged if exposed to environmental risks in the field; 5) the at least one access opening allows access of vital information very quickly in the field; 6) the at least one access opening reduces down time of the apparatus for customers because the apparatus does not need to be returned to replace the tether cable or other small field replaceable components that the at least one access opening exposes; 7) the at least one access opening includes a continuous seal around the perimeter of the at least one access opening to prevent the ingress of liquids or other contaminants during use of the apparatus; and 8) the at least one access opening is a sealed partitioned compartment from the rest of the apparatus, so even when the access cover is removed, the internal sensitive components of the apparatus are protected from ingress of liquids, dust, dirt and other contaminants, etc.

Various other features, objects, and advantages of the invention will be made apparent to those skilled in the art from the accompanying drawings and detailed description thereof.

BRIEF DESCRIPTION OF THE DRAWINGS

FIG. 5 is a plan view of a digital radiography detector assembly in accordance with another embodiment of the present invention;

FIG. 7 is an exploded perspective view of the digital radiography detector assembly of FIG. 5;

DETAILED DESCRIPTION OF THE INVENTION

Figure 1:
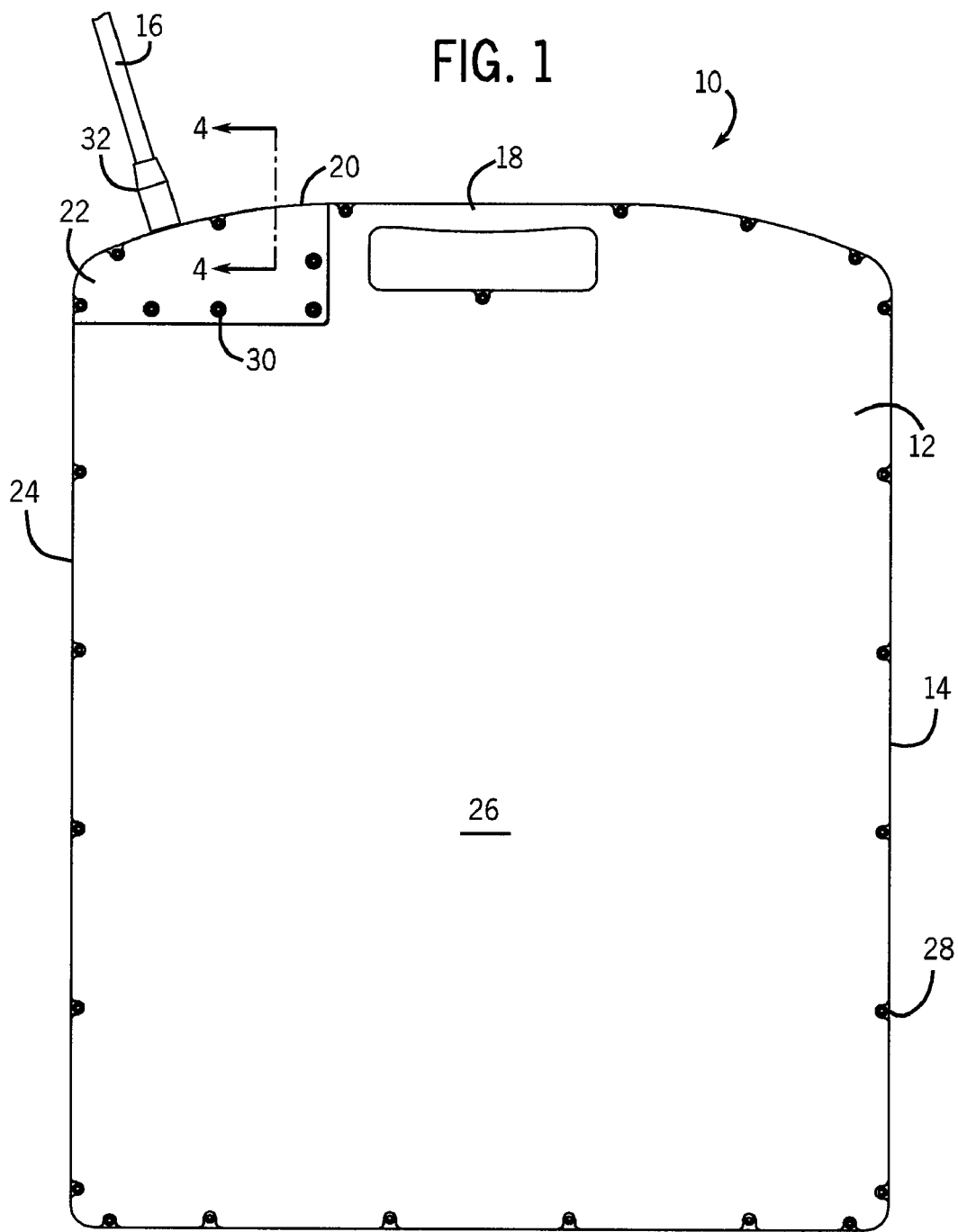
FIG. 1 is a plan view of a digital radiography detector assembly in accordance with an embodiment of the present invention.

Referring now to the drawings, FIG. 1 illustrates a digital radiography detector assembly 10 in accordance with an embodiment of the present invention. The digital radiography detector assembly 10 preferably includes an outer housing 12 enclosing a radiographic imaging device 14, a tether cable 16 extending from the radiographic imaging device 14 and outer housing 12 for connection to a digital radiography system (not shown), a handle 18 integrated into the outer housing 12 for handling and manipulating the digital radiography detector assembly 10, at least one access opening 20 formed in and extending through the outer housing 12 for accessing components within the radiographic imaging device 14, and a removable access cover 22 removably attached to the at least one access opening 20 in the housing 12. The access cover 22 is preferably removably attached to the at least one access opening 20 in housing 12 with a plurality of fastening devices 30 that removably attach access cover 22 to housing 12.

The outer housing 12 is a protective covering designed to contain and support the radiographic imaging device 14. The outer housing 12 preferably includes a first panel 24 and a second panel 26 that are attached together preferably with a plurality of fastening devices 28 to enclose the radiographic imaging device 14. In use, the first panel 24 is designed to be the imaging surface and face toward an X-ray radiation source. The first panel 24 preferably includes a plurality of LED indicator lights (not shown) to indicate the status of the radiographic imaging device 14.

The radiographic imaging device 14 is preferably a digital flat panel X-ray detector comprising an amorphous silicon (A-Si) photodiode array (thin-film transistor array) on a glass substrate with a cesium iodide (CsI) scintillator coating and associated electronic circuitry.

Figure 2:
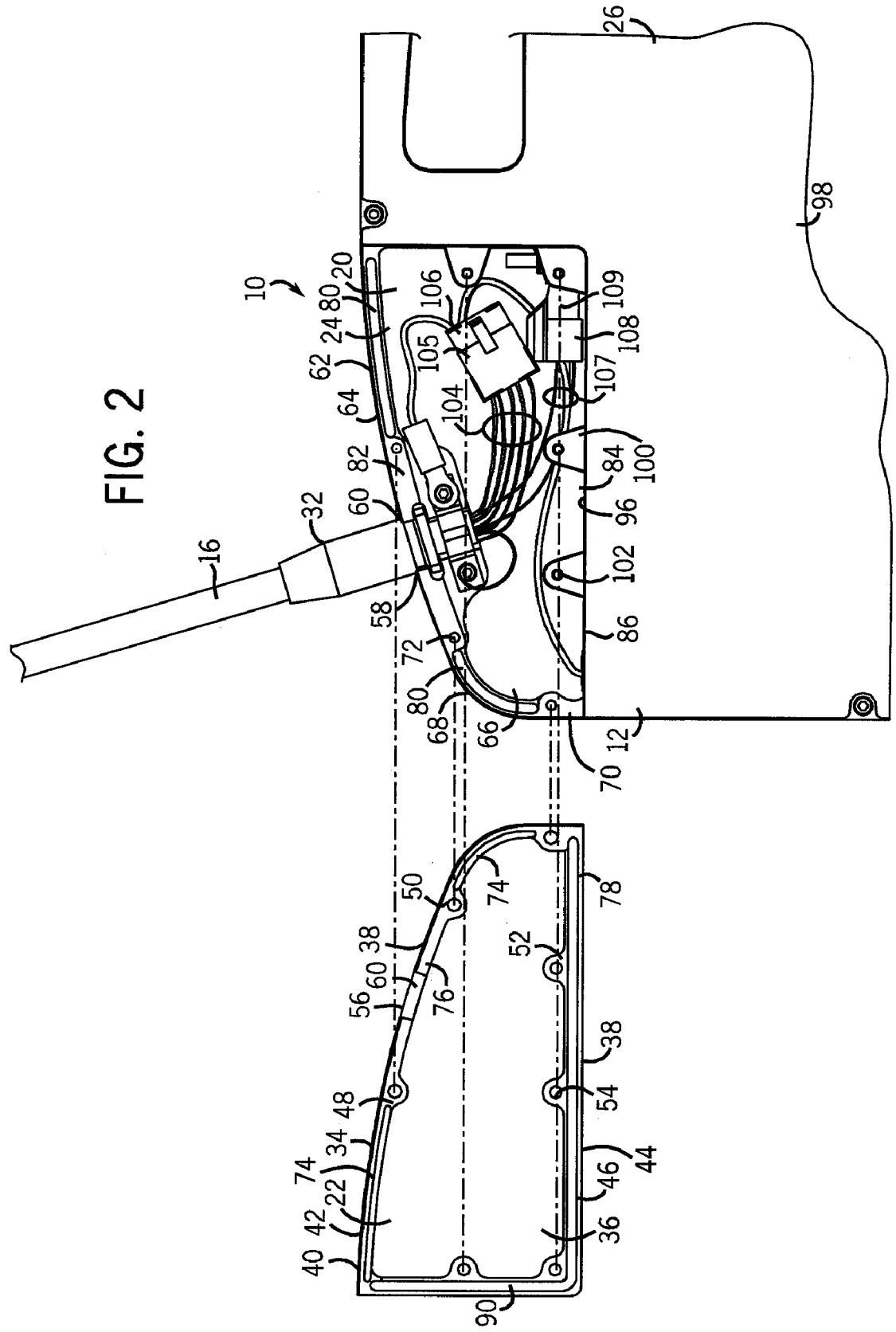
FIG. 2 is an enlarged, partially exploded, plan view of a portion of the digital radiography detector assembly of FIG. 1.
Figure 8:
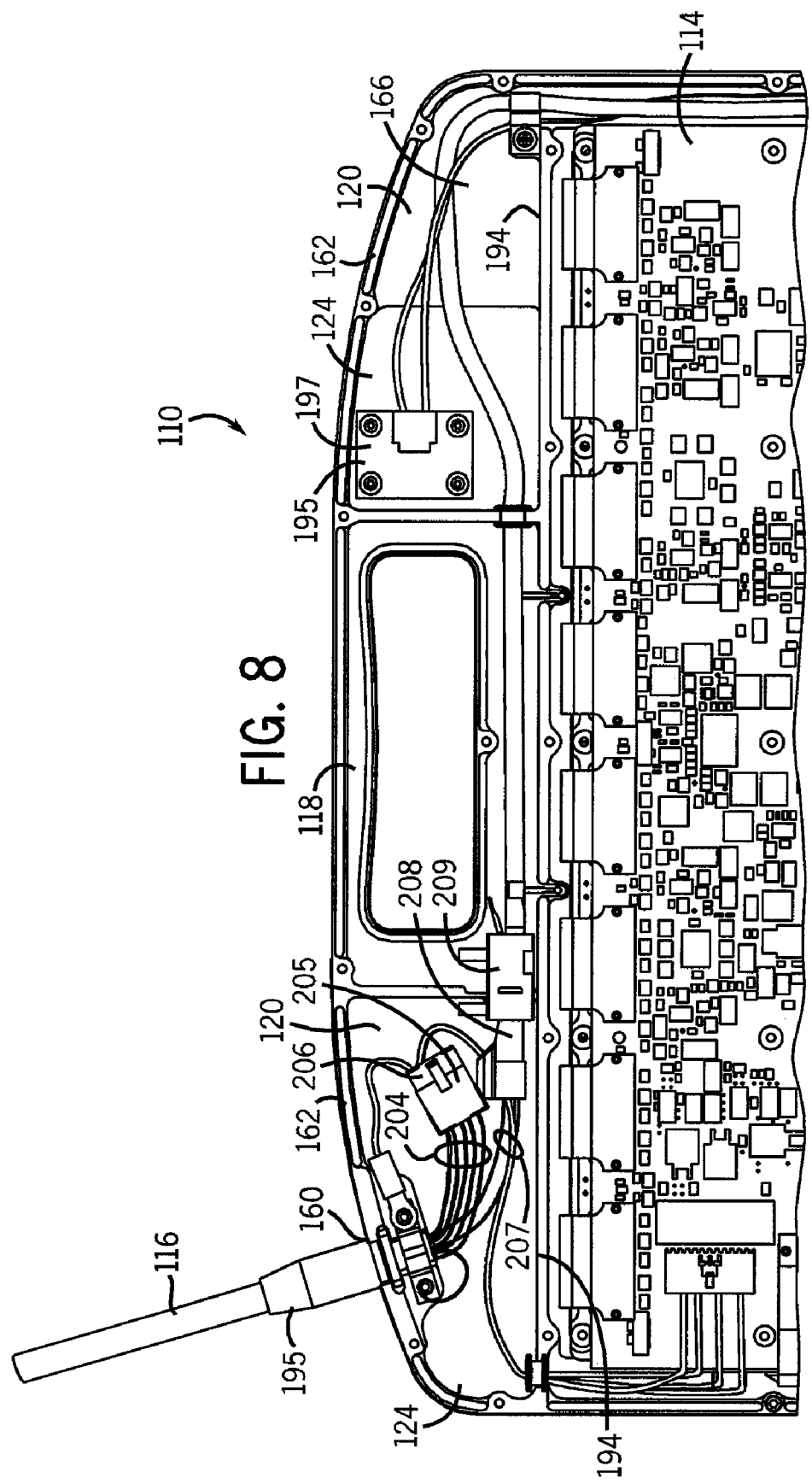
FIG. 8 is an enlarged plan view of a top portion of the digital radiography detector assembly with the panel and access covers removed from the digital radiography detector assembly.

The digital radiography detector assembly 10 interfaces with a digital radiography system (not shown). The digital radiography system is designed to both acquire original image data and to process the image data for review and display in accordance with a given imaging technique. The digital radiography detector assembly 10 is preferably coupled to a power supply or other power source on the digital radiography system as well as to an image processor or control computer on the digital radiography system through tether cable 16. Tether cable 16 includes wiring for these power and communication connections. The cable 16 preferably enters housing 12 and removably connects to at least one connector inside of access opening 20 that is accessible when access cover 22 is removed from access opening 20, as is best illustrated in FIGS. 2 and 8, for attachment to components in the radiographic imaging device 14. Due to the use and environment in which the digital radiography detector assembly 10 is used, tether cable 16 needs to be replaced periodically.

The end of cable 16 that enters housing 12 preferably includes a strain relief 32 that is added or formed around the end of cable 16 as it enters housing 12 and access opening 20. The strain relief 32 provides internal stress and flex and allows for greater flexibility of tether cable 16.

The at least one access opening formed in the first panel and/or the second panel of the housing allows the tether cable or other internal radiographic imaging device components to be removed and replaced in the field without exposing the rest of the internal radiographic imaging device electronics to the harsh environment of a hospital or clinic, reducing customer downtime, reducing detector repair costs, and reducing re-assembly risks. In contrast, prior art radiographic imaging detectors require the entire detector enclosure or housing to be opened in order to replace the tether cable or other internal components. The present invention offers a significant benefit to customers compared to prior art detectors that do not enable or allow partial access to internal radiographic imaging components.

The removable access cover exposes the at least one access opening for field replacement of a tether cable, batteries and other field replaceable components of a portable medical apparatus. The present invention would be very applicable to a military application where sand, dirt, and other debris flying around a triage unit of a mobile combat hospital could possibly damage exposed components of a portable medical apparatus. Exposing sensitive electronic components to that type of harsh environment just to replace a tether cable or other small field replaceable components is a serious risk to the portable medical apparatus, but even more serious, to the patient who needs an exam to determine the severity of an injury. The at least one access opening would allow a tether cable or other small field replaceable components to be replaced quickly and without the risk of damaging the rest of the internal components of a portable medical apparatus in a harsh environment.

Figure 9:
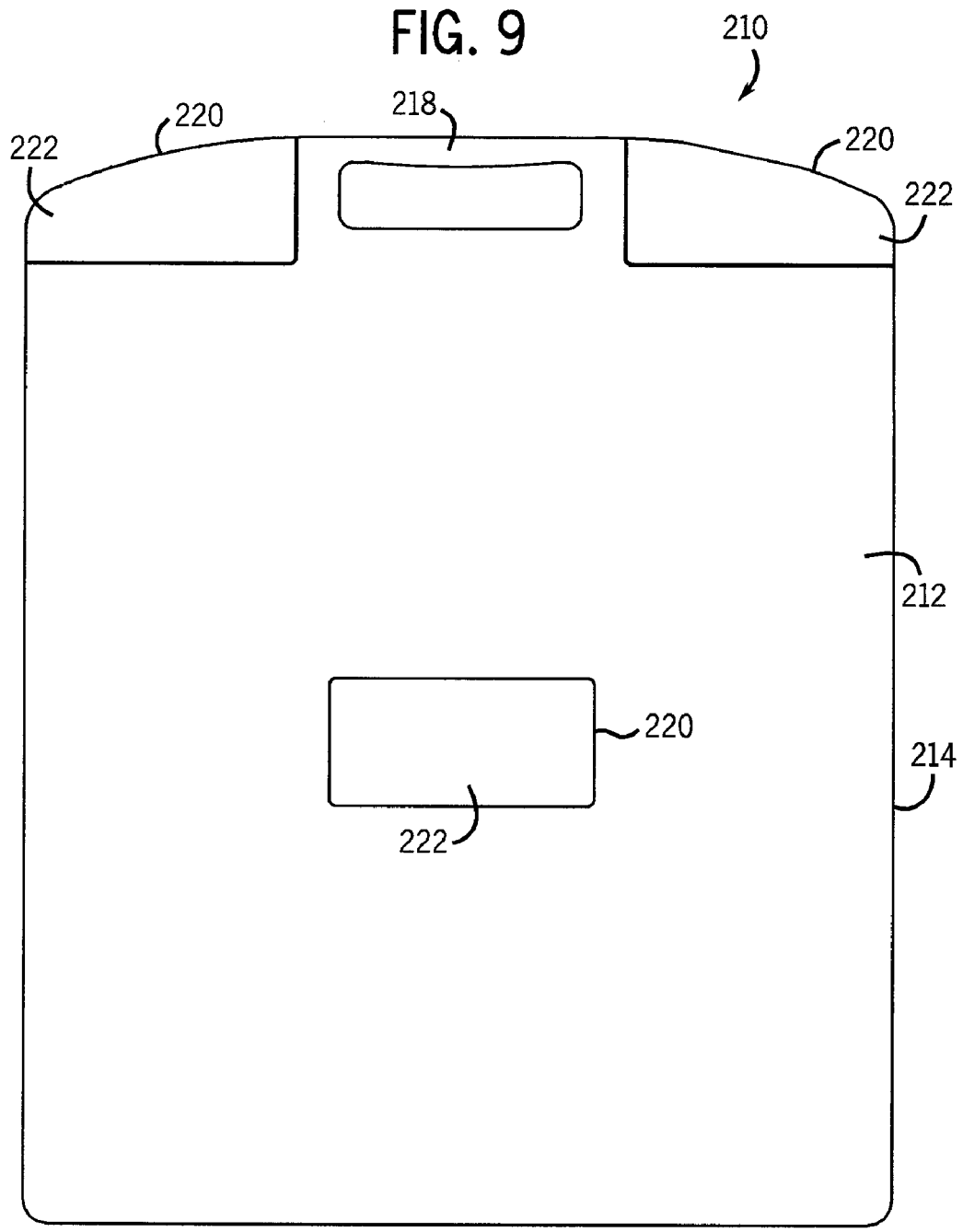
FIG. 9 is a plan view of a digital radiography detector assembly in accordance with yet another embodiment of the present invention.

FIG. 2 shows a top portion of digital radiography detector assembly 10 with access cover 22 removed from second panel 26 of outer housing 12, exposing access opening 20. The access opening 20 is formed within and extends through second panel 26 of outer housing 12. The access cover 22 removably attaches to first panel 24 and second panel 26 as shown in FIG. 2, when the access opening 20 is located at the periphery or near an edge of housing 12. However, the access cover only attaches to the second panel, if the access opening is located away from the periphery or near the center of the housing, as illustrated by the access cover located in the middle of the second panel, as shown in FIGS. 5, 7 and 9. The access cover is sized and configured to conform to the shape of the access opening.

Figure 3:
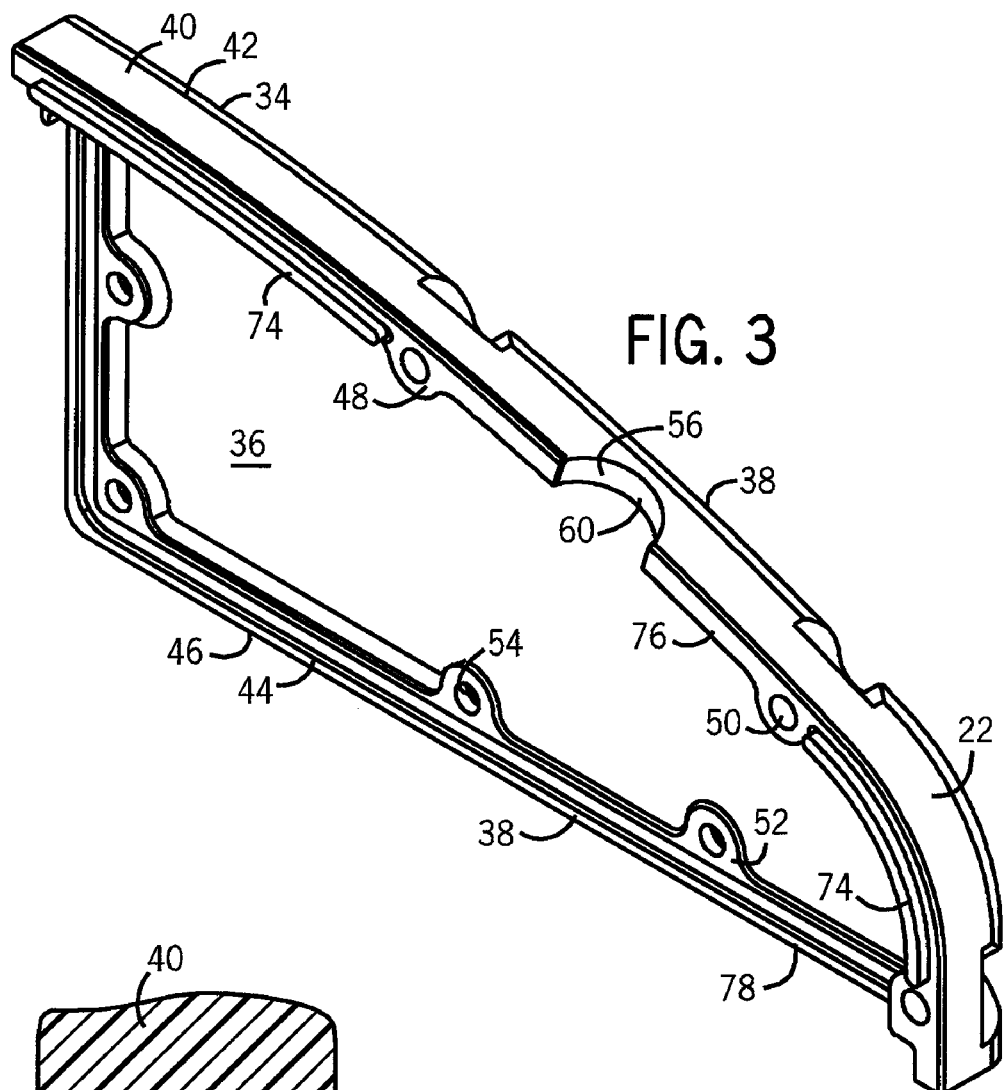
FIG. 3 is an enlarged perspective view of an access cover in accordance with an embodiment of the present invention.

As is shown in FIGS. 2 and 3, access cover 22 preferably includes an outer surface 34, an inner surface 36, an outer edge 38 that extends around the periphery of the access cover 22, a flange 40 that extends downwardly and axially from an outer portion 42 of outer edge 38 when viewed from the outer surface 34 of access cover 22, and a lip 44 that is formed on an inner portion 46 of outer edge 38. A plurality of tabs 48 are formed in flange 40 with openings 50 extending therethrough for receiving fastening devices 28, shown in FIG. 1, and a plurality of tabs 52 extending inwardly from lip 44 with openings 54 extending therethrough for receiving fastening devices 30, shown in FIG. 1, for removably attaching access cover 22 to first panel 24 and the second panel 26.

The flange 40 preferably includes a first portion 56 of a cable port opening 60 that is formed therein for receiving a portion of cable 16 with strain relief 32 therein. A second portion 58 of a cable port opening 60 extends through a flange 62 on first panel 24 for receiving a portion of cable 16 with strain relief 32 therein. The first panel 24 preferably includes an outer surface 64, an inner surface 66, and flange 62 that extends upwardly and axially from an outer edge 68 when viewed from the inner surface 66 of first panel 24. When access cover 22 is attached to first panel 24 and second panel 26, the first 56 and second 58 portions of cable port opening 60 coincide and cooperate to form the full cable port opening 60 that is designed to fit snugly around strain relief 32 of cable 16. The flange 62 of first panel 24 preferably includes a plurality of tabs 70 formed therein with openings 72 extending therethrough. These tabs 70 and openings 72 coincide and correspond with tabs 48 and openings 50 on flange 40 of access cover 22, for receiving fastening devices 28 for attaching access cover 22 to first panel 24.

Figure 4:
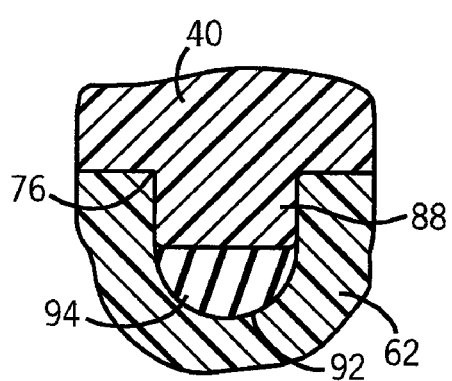
FIG. 4 is a cross-sectional view of the digital radiography detector assembly of FIG. 1 taken along line 4-4 of FIG. 1.

When access cover 22 is attached to first panel 24 and second panel 26, the access cover 22 is preferably sealed against first panel 24 and the second panel 26. In one embodiment, the access cover 22 preferably includes a sealing member 74 extending around an exposed mating surface 76 of flange 40 and extending around an exposed mating surface 78 of lip 44 to seal access cover 22 to first panel 24 and second panel 26. The sealing member 74 may be a flexible gasket or any other sealing device made of flexible, resilient, polymeric or elastomer material. In another embodiment, the first panel 24 preferably includes a sealing member 80 extending around an exposed mating surface 82 of flange 62 and second panel 26 preferably includes a sealing member 84 extending around an exposed edge 86 for sealing against flange 40 and lip 44 of access cover 22. The sealing members 80, 84 may be flexible gaskets or any other sealing device made of flexible, resilient, polymeric or elastomer material. In yet another embodiment, the access cover 22 preferably includes a first sealing member 88 extending around the exposed mating surface 76 of flange 40 and a second sealing member 90 extending around the exposed mating surface 78 of lip 44. The flange 62 of first panel 24 includes a groove 92 formed therein for accepting the first sealing member 88 therein. The second sealing member 90 seals lip 44 to the exposed edge 86 of second panel 26. The first sealing member 88 may be attached to the exposed mating surface 76 of flange 40 or the first sealing member 88 may be integral with flange 40. A sealant 94 may be added to groove 92 to enhance the sealing properties, as is shown in FIG. 4.

The second panel 26 preferably includes at least one access opening 20 cutout or formed therein and extending therethrough for receiving removable access cover 22. The access opening 20 preferably includes at least one sidewall 96 extending downwardly and axially from an outer surface 98 of second panel 26 with an exposed edge 86. The exposed edge 86 preferably includes a plurality of tabs 100 extending outwardly therefrom and arranged around the periphery thereof for facilitating attachment of the access cover 22 to the second panel 26. The tabs 100 preferably include openings 102 extending therethrough for receiving and accepting fastening devices 30. These tabs 100 and openings 102 coincide and correspond with tabs 52 and openings 54 extending from lip 44 of access cover 22, for receiving fastening devices 30 for attaching access cover 22 to second panel 26.

The access opening 20 is used for gaining access to the radiographic imaging device 14, removing and replacing tether cable 16 or other small field replaceable components, or exposing a diagnostic connection for field engineers to troubleshoot the radiographic imaging device 14. As described above, access opening 20 is preferably sealed by access cover 22 against first panel 24 and/or second panel 26, so that connections, information, and material inside the access opening 20 are protected from the ingress of fluids after access cover 22 is re-attached to first panel 24 and/or second panel 26. However, access opening 20 may be unsealed as well. The access opening 20 is preferably partitioned with at least one sidewall 96 that is formed in first panel 24 and/or second panel 26 and surrounds the interior of access opening 20 to protect the rest of the radiographic imaging device 14 components from being exposed to the harsh environment of a hospital or clinic, once access cover 22 is removed. Therefore, the at least one access opening 22 exposes a partitioned portion of the radiographic imaging device 14, while protecting the rest of the radiographic imaging device 14 from the ingress of fluids, dust, dirt, and other contaminants, etc.

As shown in FIG. 2, tether cable 16 enters housing 12 through cable port opening 60. Wiring from cable 16 is separated into a first set of wires 104 connecting to a first connector 105 that mates with a first mating connector 106 that is accessible in access opening 20, and a second set of wires 107 connecting to a second connector 108 that mates with a second mating connector 109 that is accessible in access opening 20. Therefore, to remove tether cable 16 from housing 12, simply remove access cover 22 from access opening 20, disconnect first connector 105 from first mating connector 106 and disconnect second connector 108 from second mating connector 109. A new tether cable can then be installed by connecting the first and second set of wires with their first and second connectors to the appropriate first and second mating connectors that are accessible in access opening.

FIG. 4 illustrates an embodiment for sealing access cover 22 to first panel 24. In this embodiment, access cover 22 preferably includes a first sealing member 88 integral with or extending from an exposed mating surface 76 of flange 40. The flange 62 of first panel 24 preferably includes a groove 92 formed therein for accepting the first sealing member 88. A sealant 94 may be added to groove 92 to enhance the sealing properties of the seal. The seal may optionally include an adhesive for attaching first sealing member 88 to the exposed mating surface 76 of flange 40.

FIG. 5 shows another embodiment of a digital radiography detector assembly 110 with a plurality of access openings 120 covered by a plurality of removable access covers 122. The digital radiography detector assembly 110 preferably includes an outer housing 112 enclosing a radiographic imaging device 114, a tether cable 116 extending from the radiographic imaging device 114 and outer housing 112 for connection to a digital radiography system (not shown), and a handle 118 integrated into the outer housing 112 for handling and manipulating the digital radiography detector assembly 110. The plurality of access openings 120 with removable access covers 122 are provided for accessing field replaceable components within the radiographic imaging device 114 or components that are external to the device 114 but attach internally within the device 114. The plurality of access covers 122 are preferably removably attached to the plurality of access openings 120 with a plurality of fastening devices 130. The outer housing 112 preferably includes a first panel 124 and a second panel 126 that are attached together preferably with a plurality of fastening devices 128 to enclose the radiographic imaging device 114.

Figure 6:
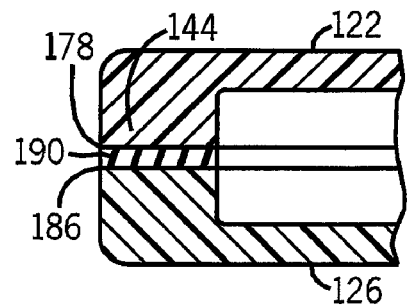
FIG. 6 is a cross-sectional view of the digital radiography detector assembly of FIG. 5 taken along line 6-6 of FIG. 5.

FIG. 6 illustrates an embodiment for sealing access cover 122 to second panel 126. In this embodiment, access cover 122 preferably includes a sealing member 190 attached to and extending around an exposed mating surface 178 of a lip 144 on access cover 122 to seal access cover 122 to second panel 126. Alternatively, the sealing member 190 may be attached to and extending around an exposed edge 186 of second panel 126. The sealing member 190 seals lip 144 of access cover 122 to the exposed edge 186 of second panel 126. The sealing member 190 may be attached to the exposed mating surface 178 of lip 144 on access cover 122 and/or the exposed edge 186 of second panel 126. The seal may optionally include an adhesive for attaching sealing member 190 to exposed mating surface 178 of lip 144 and/or exposed edge 186 of second panel 126. The sealing member 190 may be a flexible gasket or any other sealing device made of flexible, resilient, polymeric or elastomer material.

FIG. 7 shows the digital radiography detector assembly 110 of FIG. 5. The digital radiography detector assembly 110 includes an outer housing 112 with a first panel 124 and a second panel 126 that are attached together preferably with a plurality of fastening devices 128 to enclose a radiographic imaging device 114 therein. The second panel 126 having a plurality of access openings 120 formed therein for accessing the field replaceable components 195 within the radiographic imaging device 114. The plurality of access openings 120 are positioned at different locations on second panel 126. Each access opening 120 is preferably covered by a removable access cover 122. The plurality of access covers 122 are preferably removably attached to the plurality of access openings 120 with a plurality of fastening devices 130.

The plurality of access openings 120 are used for gaining access to the radiographic imaging device 114, removing and replacing tether cable 116 or other small field replaceable components 195, or exposing a diagnostic connection for field engineers to troubleshoot the radiographic imaging device 114. The field replaceable components 195 may include but are not limited to memory components, LEDs, small printed circuit boards, batteries and diagnostic devices, etc. Each access opening 120 is preferably sealed by access cover 122 against first panel 124 and/or second panel 126, so that connections, information, and material inside the access opening 120 are protected from the ingress of fluids after access cover 122 is re-attached to first panel 124 and/or second panel 126. Each access opening 120 is preferably partitioned with at least one sidewall 196 that is formed in first panel 124 and/or second panel 126 and surrounds the interior of each access opening 120 to protect the rest of the radiographic imaging device 114 components from being exposed to the harsh environment of a hospital or clinic, once access cover 122 is removed.

Each access opening 120 preferably includes at least one sidewall 196 extending downwardly and axially from an outer surface 198 of second panel 126. The at least one sidewall 196 preferably includes an exposed edge 186 with a plurality of tabs 200 extending outwardly therefrom and arranged around the periphery thereof for facilitating attachment of the access covers 122 to second panel 126. The tabs 200 preferably include openings 202 extending therethrough for receiving and accepting fastening devices 130. These tabs 200 and openings 202 coincide and correspond with tabs 152 and openings 154 extending from a lip 144 of the plurality of access covers 122, for receiving fastening devices 130 for attaching access covers 122 to second panel 126.

FIG. 8 illustrates a top portion of the digital radiography detector assembly 110 with the second panel 126 and the top access covers 122 removed. The portion of the digital radiography detector assembly 110 shown includes first panel 124 with the radiographic imaging device 114 and at least two access openings 120 exposed.

The access openings 120 are preferably partitioned around their periphery with a flange 162 and/or at least one sidewall 194 that is formed in first panel 124. The flange 162 and/or at least one sidewall 194 extend upwardly and axially from an inner surface 166 of first panel 124 surrounding the interior of each access opening 120 to protect the internal components of radiographic imaging device 114 from the outside environment once access cover 122 is removed from the access opening 120.

The field replaceable components 195 exposed within access openings 122 include but are not limited to tether cable 116 and LED printed circuit board 197. Tether cable 116 enters first panel 126 through cable port opening 160. Wiring from cable 116 is separated into a first set of wires 204 connecting to a first connector 205 that mates with a first mating connector 206 accessible in access opening 120, and a second set of wires 207 connecting to a second connector 208 that mates with a second mating connector 209 accessible in access opening 120. Therefore, to remove tether cable 116 from housing 112, simply remove access cover 122 from access opening 120, disconnect first connector 205 from first mating connector 206 and disconnect second connector 208 from second mating connector 209. A new tether cable can then be installed by connecting the first and second set of wires with their first and second connectors to the appropriate first and second mating connectors that are accessible in the access opening. The LED printed circuit board 197 can be removed and replaced by using a similar procedure.

FIG. 9 shows an embodiment of a wireless, battery powered digital radiography detector assembly 210 with a plurality of access openings 220 covered by a plurality of removable access covers 222. The wireless, battery powered digital radiography detector assembly 210 preferably includes an outer housing 212 enclosing a radiographic imaging device 214, and a handle 218 integrated into the outer housing 212 for handling and manipulating the digital radiography detector assembly 210. The plurality of access openings 220 with removable access covers 222 are provided for accessing field replaceable components, including but not limited to memory components, LEDs, small printed circuit boards, batteries and diagnostic devices, etc., within the radiographic imaging device 214 or components that are external to the device but attach internally within the device 214. The plurality of access covers 222 are preferably removably attached to the plurality of access openings 220. In this embodiment, the digital radiography detector assembly 210 is not tethered to a digital radiography system (not shown). The digital radiography detector assembly 210 is preferably battery powered with a wireless communication connection to the digital radiography system.

Figure 10:
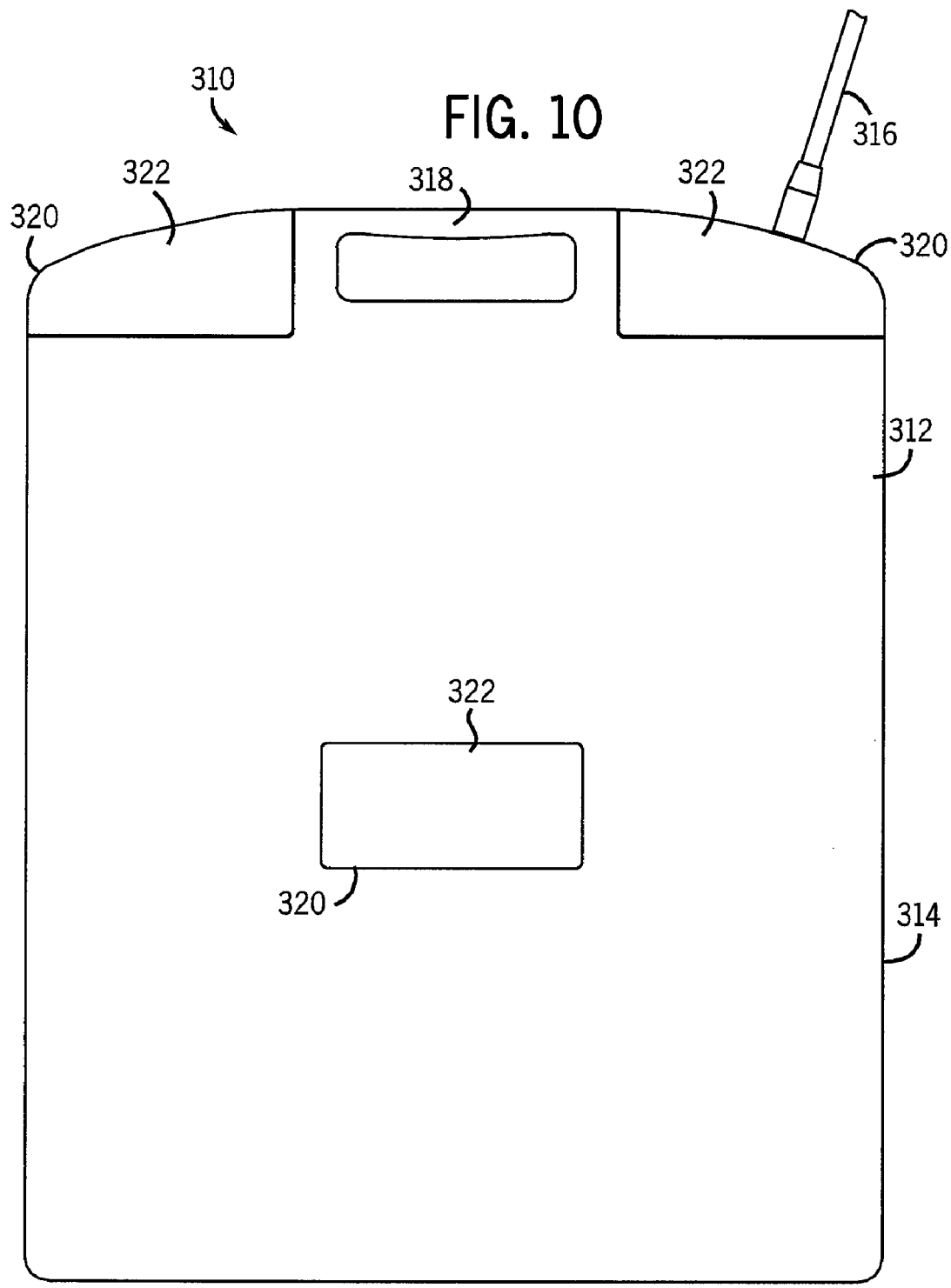
FIG. 10 is a plan view of a digital radiography detector assembly in accordance with still yet another embodiment of the present invention.

FIG. 10 illustrates a digital radiography detector assembly 310 in accordance with still yet another embodiment of the present invention. The digital radiography detector assembly 310 preferably includes an outer housing 312 enclosing a radiographic imaging device 314, a tether cable 316 extending from the radiographic imaging device 314 and outer housing 312 for connection to a digital radiography system (not shown), a handle 318 integrated into the outer housing 312 for handling and manipulating the digital radiography detector assembly 310, at least one access opening 320 formed in and extending through the outer housing 312 for accessing components within the radiographic imaging device 314, and at least one removable access cover 322 removably attached to the at least one access opening 320 in the housing 312. The at least one access cover 322 is preferably removably attached to the at least one access opening 320 in housing 312. The outer housing 312 is a protective covering designed to contain and support the radiographic imaging device 314 therein.

Figure 11:
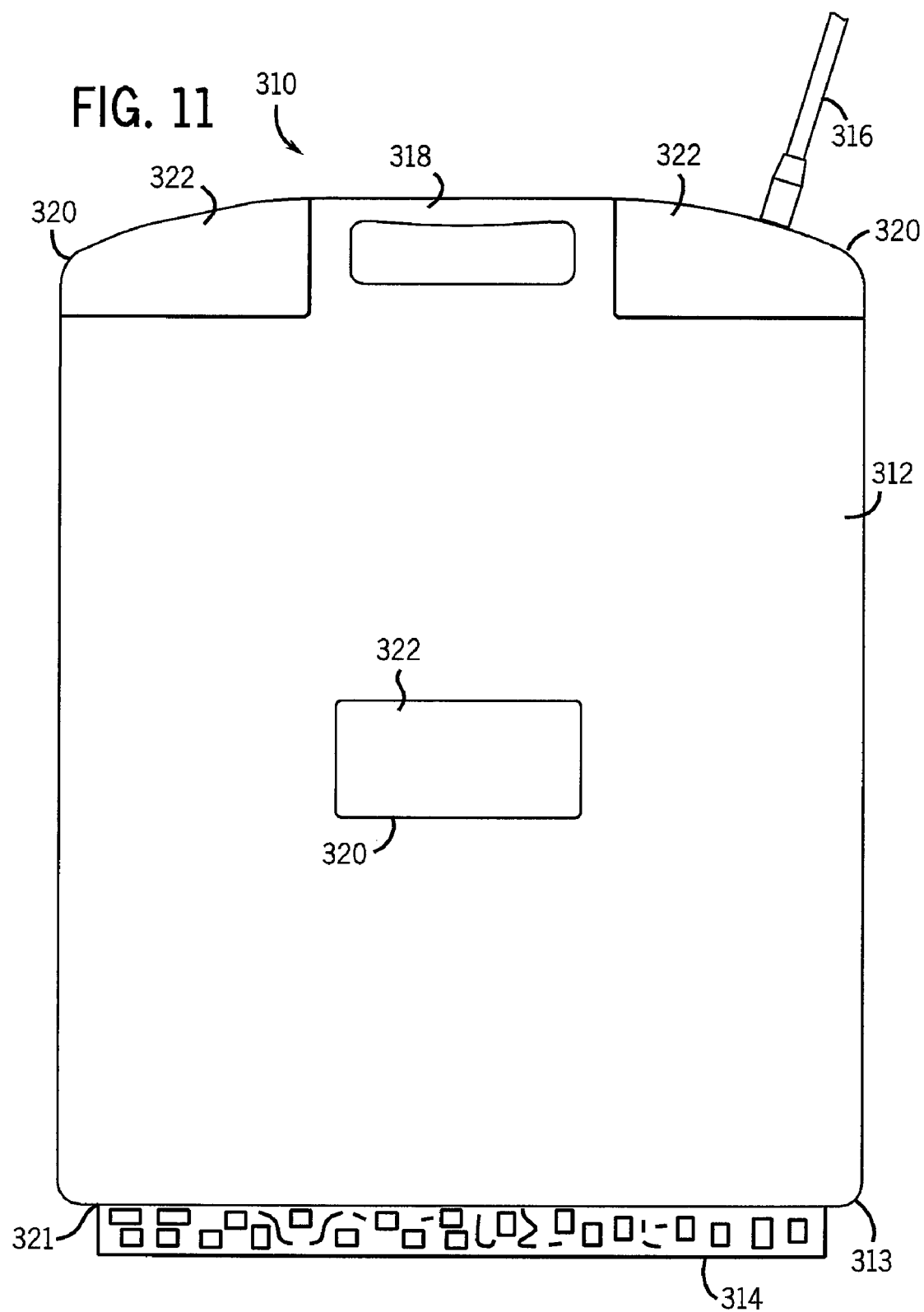
FIG. 11 is a plan view of the digital radiography detector assembly of FIG. 10 with a radiographic imaging device extending partially from an opening on one side of the assembly.

FIG. 11 shows the digital radiography detector assembly 310 of FIG. 10 with a radiographic imaging device 314 extending partially outwardly from an opening 321 extending through a side 313 of the assembly. The opening 321 preferably including a removable cover (not shown) for closing the opening 321.

In this embodiment, the outer housing 312 may be an integral single-piece enclosure with the at least one opening 321 extending through at least one side 313 thereof for insertion and removal of the imaging device 314. Alternatively, the outer housing 312 may include at least two panels fastened or snapped together. The at least one access opening 320 with at least one removable access cover 322 may be located anywhere on the outer housing 312, including, but not limited to an edge, an end, a side, a front, a top, or a bottom of the outer housing 312. The at least one access cover 322 may be flat or any other configuration, and may not extend through the outer housing 312. The at least one access cover 322 is preferably removably fastened or snapped onto the at least one access opening 320.

Figure 12:
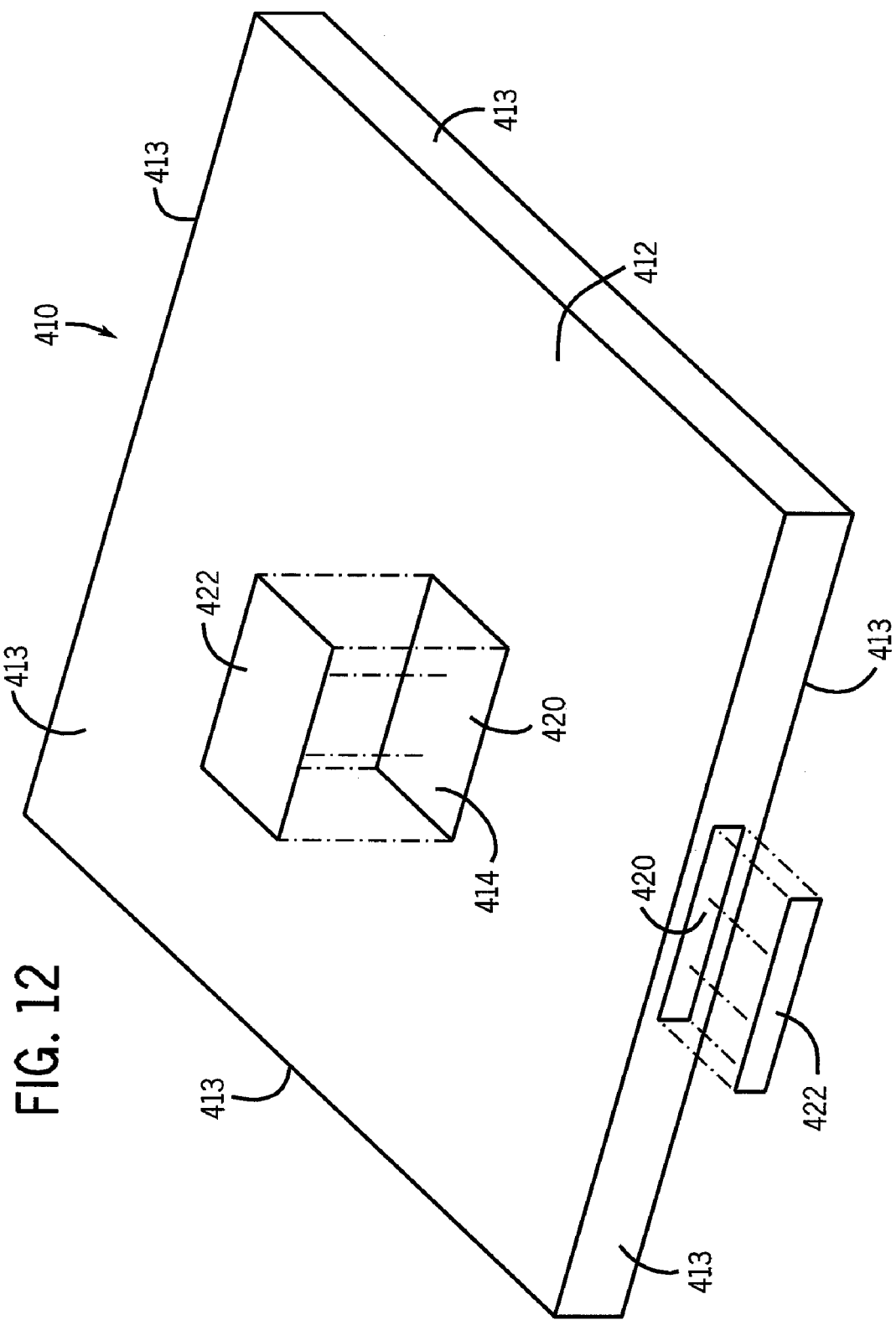
FIG. 12 is a perspective view of a digital radiography detector assembly in accordance with yet a further embodiment of the present invention.

FIG. 12 illustrates a digital radiography detector assembly 410 in accordance with yet a further embodiment of the present invention. The digital radiography detector assembly 410 preferably includes an outer housing 412 with a plurality of sides 413 enclosing a radiographic imaging device 414 therein, at least one access opening 420 formed in and extending through any of the sides 413 of the outer housing 412 for accessing components within the radiographic imaging device 414, and at least one removable access cover 422 removably attached to the at least one access opening 420.

In this embodiment, the outer housing 412 may be an integral single-piece enclosure having a plurality of sides 413 that may include at least one access opening 420 extending through any of the sides 413. The at least one access cover 422 may be flat or any other configuration, and may not extend through outer housing 412. The at least one access cover 422 is preferably removably fastened or snapped onto the at least one access opening 420.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

What is claimed is:

1. A portable medical apparatus comprising:
   a housing;
   a radiographic imaging device enclosed within the housing;
   at least one access opening extending through the housing for accessing components of the radiographic imaging device; and
   an access cover removably attached to the at least one access opening;
   wherein the at least one access opening includes a sealing member extending around an outer periphery thereof for sealing the access cover to the at least one access opening; and
   wherein the housing seals the outer periphery of the at least one access opening from the radiographic imaging device so that only the components of the radiographic imaging device within the access opening are exposed to the environment when the access cover is removed from the at least one access opening.

2. The apparatus of claim 1, wherein the housing includes a first panel and a second panel attached together with a plurality of fastening devices to enclose the radiographic imaging device therein.

3. The apparatus of claim 2, wherein the at least one access opening extends through the first panel of the housing.

4. The apparatus of claim 2, wherein the at least one access opening extends through the second panel of the housing.

5. The apparatus of claim 1, wherein the access cover includes a sealing member extending around an outer periphery thereof for sealing the access cover to the at least one access opening.

6. The apparatus of claim 5, wherein the sealing member is integral with the outer periphery of the access cover.

7. The apparatus of claim 5, wherein the sealing member is attached to the outer periphery of the access cover.

8. The apparatus of claim 1, wherein the radiographic imaging device is a digital flat panel X-ray detector.

9. The apparatus of claim 1, wherein the access cover is sealed against the at least one access opening.

10. The apparatus of claim 1, wherein the sealing member is integral with the outer periphery of the at least one access opening.

11. The apparatus of claim 1, wherein the sealing member is attached to the outer periphery of the at least one access opening.

12. The apparatus of claim 1, wherein the access cover includes a first sealing member extending around an outer periphery thereof and the at least one access opening includes a second sealing member extending around an outer periphery thereof for sealing the access cover to the at least one access opening.

13. A digital radiography detector assembly comprising:
   a radiographic imaging device;
   an outer housing enclosing the radiographic imaging device therein;
   at least one access opening extending through the outer housing for accessing field replaceable components within the radiographic imaging device or components that are external to the device but attach internally within the device;
   a removable access cover removably attached to the at least one access opening; and
   a tether cable extending from the radiographic imaging device for connection to a digital radiography system.

14. The assembly of claim 13, wherein the tether cable is a field replaceable component.

15. The assembly of claim 13, wherein the outer housing includes a first panel and a second panel attached together with a plurality of fastening devices to enclose the radiographic imaging device therein.

16. The assembly of claim 13, wherein the radiographic imaging device is a digital flat panel X-ray detector.

17. The assembly of claim 15, wherein the at least one access opening extends through the first panel of the outer housing.

18. The assembly of claim 15, wherein the at least one access opening extends through the second panel of the outer housing.

19. The assembly of claim 15, wherein the access cover removably attaches to the first panel and the second panel.

20. The assembly of claim 15, wherein the access cover removably attaches to the first panel.

21. The assembly of claim 15, wherein the access cover removably attaches to the second panel.

22. A digital radiography detector assembly comprising:
- a radiographic imaging device;
- an outer housing enclosing the radiographic imaging device therein;
- at least one access opening extending through the outer housing for accessing field replaceable components within the radiographic imaging device or components that are external to the device but attach internally within the device; and
- a removable access cover removably attached to the at least one access opening;
- wherein the access cover is sealed against the outer housing;
- wherein the at least one access opening includes a sealing member extending around an outer surface of an outer periphery thereof for sealing the access cover to the at least one access opening in the outer housing; and
- wherein the housing seals the outer periphery of the at least one access opening from the radiographic imaging device so that only the components of the radiographic imaging device within the access opening are exposed to the environment when the access cover is removed from the at least one access opening.

23. The assembly of claim 22, wherein the access cover includes a sealing member extending around an inner surface of an outer periphery thereof for sealing the access cover to the at least one access opening in the outer housing.

24. The assembly of claim 22, wherein the access cover includes a first sealing member extending around an inner surface of an outer periphery thereof and the at least one access opening includes a second sealing member extending around an outer surface of an outer periphery thereof for sealing the access cover to the at least one access opening.

25. A wireless digital radiography detector assembly comprising:
- a housing having a first panel attached to a second panel with a plurality of fastening devices;
- a digital radiographic imaging device enclosed within the first panel and the second panel of the housing;
- at least one access opening extending through the first panel and/or the second panel of the housing for accessing field replaceable components within the digital radiographic imaging device or components that are external to the device but attach internally within the device; and
- a removable access cover removably attached to the at least one access opening;
- wherein the at least one access opening includes a sealing member extending around an outer periphery thereof for sealing the removable access cover to the at least one access opening.

* * * * *